United States Patent Office 3,369,830
Patented Feb. 20, 1968

3,369,830
TUBULAR HANDLE CONNECTION
Carl E. Meyerhoefer, Little Neck, N.Y., assignor to
The Regina Corporation, Rahway, N.J., a corporation of Delaware
Filed Dec. 30, 1966, Ser. No. 606,185
2 Claims. (Cl. 287—20)

ABSTRACT OF THE DISCLOSURE

This invention relates to mounting a handle to the tool holding head of a floor care tool such as a brush or a mop. A split sleeve is formed with a plurality of tabs on one end; some of the tabs are bent radially inwardly of the sleeve. The other tabs extend axially into mating holes in the tool head. A circular spring washer rests on the inwardly facing tabs and is through bolted to the tool head. The handle is held by a transverse bolt through the sleeve.

This invention relates to an improvement in the connection of a tubular handle to a yoke such as is found in floor care machines and the like.

The principal object of this invention is to provide means for rigidly securing a tubular handle to a yoke with simple hand tools and with parts largely concealed within the handle.

Another object is to accomplish the desired result with economically produced parts.

Other objects will appear from the description which follows and the drawings in which.

Figure 1:
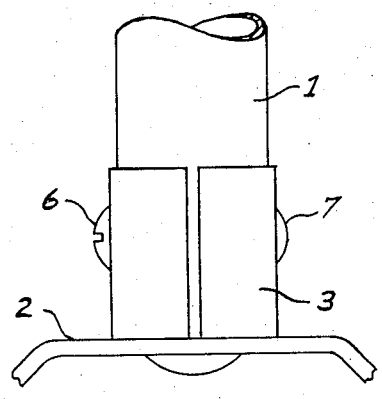
FIGURE 1 is a rear elevational view of a handle connected to the top of a yoke with a connection embodying this invention.
Figure 2:
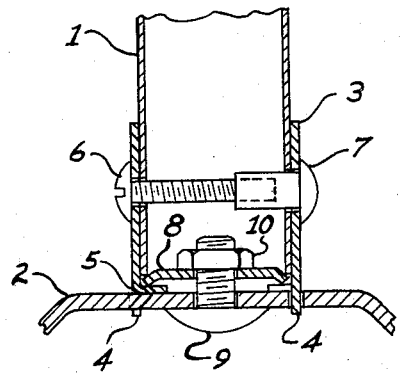
FIGURE 2 is a vertical cross section of the connection of FIGURE 1.
Figure 3:
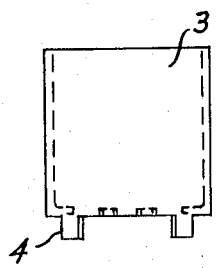
FIGURE 3 is a front elevational view of the socket portion of the connection.
Figure 4:
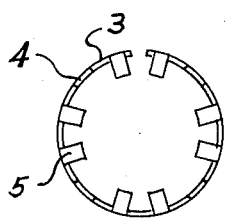
FIGURE 4 is a bottom view of the socket portion of the connection.

Referring to the drawings in which the same number refers to the same or a similar part, FIGURE 1 shows the lower portion of tubular handle 1, seated in handle socket 3 and secured to the upper part of yoke 2.

Handle socket 3 is essentially a split sleeve having at its lower end four downwardly projecting ears 4 and eight inwardly turned ears 5, and having an inside diameter sufficient to accommodate the end of handle 1.

Slots are let in the top of yoke 2 into which the depending ears 4 are inserted with handle socket 3 bearing on the yoke top surface with ears 5. A pair of holes in handle 1 and a pair of holes in handle socket 3 are in registry when the bottom of handle 1 is sufficiently above ears 5 to admit the turned down edge of clamping washer 8.

Handle tube screw 6 and nut 7 engage the wall of handle socket 3 and prevent handle 1 from being withdrawn from its socket. Clamping screw 9 and nut 10 hold clamping washer 8 in place and by tightening them cause washer 8 to flex outwardly and force its turned down edge in wedging engagement with the bottom edge of handle 1 and ears 5.

The assembly of the connection requires the seating of handle socket 3 on yoke 2, insertion of clamping washer 8 and its preliminary attachment to yoke 2 by means of clamping screw 9 and nut 10. Next handle 1 is inserted in the socket and by means of handle tube screw 6 and nut 7 secured firmly to handle socket 3. Tightening of clamping screw 9 will completely lock the parts together.

Many other applications of this invention may be made and by describing the foregoing use it is not intended thereby to limit the scope of this invention.

What I claim is:

1. The connection of a tube to a flat surface comprising
    a split sleeve encasing one end of a tube the bottom of the sleeve having a plurality of ears turned inward at right angles to the axis of the sleeve and a plurality of ears extending straight downward,
    a plurality of slots in the top of the flat surface in which the downward extending ears of the sleeve are seated in fixed engagement,
    spring pressed locking means securing the inwardly turned ears to the flat surface, and
    means transverse the axis of the tube securing the tube and the sleeve in locking engagement.

2. A tubular handle connection to a yoke comprising
    a split sleeve encasing one end of a tubular handle, the bottom of the sleeve having a plurality of ears turned inward at right angles to the axis of the sleeve and a plurality of ears extending straight downward,
    a plurality of slots in the top surface of the central horizontal portion of the yoke in which the downward extending ears of the sleeve are seated,
    a cupped washer with its rim seated between the end of the tubular handle and the top surfaces of the inwardly turned ears,
    a screw through the top of the yoke and a centrally located hole in the washer in clamping engagement therewith, and
    a screw through the walls of the handle and the sleeve transverse to the axis of the tubular handle in locking engagement therewith.

References Cited

UNITED STATES PATENTS

| | | | |
|---|---|---|---|
| 1,562,419 | 11/1925 | Bowen | 287—20 X |
| 2,464,405 | 3/1949 | Knauf | 287—20 X |
| 2,654,620 | 10/1953 | Tinnerman | 287—20 |

FOREIGN PATENTS

| | | |
|---|---|---|
| 284,065 | 1/1928 | Great Britain. |
| 34,866 | 5/1929 | France. |

CARL W. TOMLIN, *Primary Examiner.*
WAYNE L. SHEDD, *Assistant Examiner.*